(12) United States Patent
Singh et al.

(10) Patent No.: US 11,305,742 B2
(45) Date of Patent: Apr. 19, 2022

(54) VEHICLE GRILLE ASSEMBLY

(71) Applicant: Nissan North America, Inc., Franklin, TN (US)

(72) Inventors: Jasvir Singh, Novi, MI (US); Andrew Kornblatt, West Bloomfield, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 174 days.

(21) Appl. No.: 16/383,260

(22) Filed: Apr. 12, 2019

(65) Prior Publication Data
US 2020/0324739 A1 Oct. 15, 2020

(51) Int. Cl.
*B60S 1/66* (2006.01)
*B60S 1/56* (2006.01)
*B60S 1/52* (2006.01)
*B60S 1/08* (2006.01)
*B08B 3/04* (2006.01)
*B62D 25/08* (2006.01)
*B60R 13/00* (2006.01)

(52) U.S. Cl.
CPC ............ *B60S 1/66* (2013.01); *B08B 3/04* (2013.01); *B60S 1/0848* (2013.01); *B62D 25/085* (2013.01); *B60R 13/005* (2013.01); *B60S 1/52* (2013.01); *B60S 1/56* (2013.01)

(58) Field of Classification Search
CPC ...... B60S 1/62; B60S 1/56; B60S 1/66; B60S 1/52; B60S 1/528; B60S 1/0848; B62D 25/085; B60R 13/005; B60R 1/0602; B05B 15/00; B05B 15/70; B05B 15/74; B08B 3/04
USPC ...................................................... 296/193.1
See application file for complete search history.

(56) References Cited

U.S. PATENT DOCUMENTS 3,058,142 A 9/1961 Pollock
5,046,449 A * 9/1991 Nelson .................... B60R 99/00
                                                118/315
10,399,106 B2 * 9/2019 Dudar ...................... B60S 1/56
(Continued)

FOREIGN PATENT DOCUMENTS

CN    201276095 Y  *  7/2009  ............. B60S 1/528
DE  102018008105 A1 *  4/2020  ............... B60S 1/56
(Continued)

OTHER PUBLICATIONS

CN201276095, Peng et al., "Telescopic Car Headlamp Washer", Jul. 22, 2009, Chinese Patent Office (Year: 2009).*
(Continued)

*Primary Examiner* — Dennis H Pedder
*Assistant Examiner* — Joyce Eileen Hill
(74) *Attorney, Agent, or Firm* — Global IP Counselors, LLP

(57) ABSTRACT

A vehicle grille assembly includes a vehicle grille, a grille badge and a washer assembly. The grille has an interior side and an exterior side. The grille badge is supported on a surface of the exterior side of the grille. The washer assembly is disposed adjacent to the grille badge and has a nozzle being configured to move between a stowed position and an operating position. The nozzle is stowed on the interior side of the vehicle grille in the stowed position. The nozzle is on the exterior side of the vehicle grille in the operating position to dispense cleaning fluid toward the grille badge.

17 Claims, 7 Drawing Sheets

(56) References Cited

U.S. PATENT DOCUMENTS

| | | | |
|---|---|---|---|
| 2003/0116645 A1* | 6/2003 | Hirose | B60S 1/528 239/284.2 |
| 2005/0121539 A1* | 6/2005 | Takada | B60S 1/52 239/284.2 |
| 2005/0200840 A1* | 9/2005 | Terui | G01S 7/4813 356/237.2 |
| 2006/0113404 A1* | 6/2006 | Sato | B60S 1/528 239/284.2 |
| 2013/0107046 A1* | 5/2013 | Forgue | B60R 19/52 348/148 |
| 2014/0008460 A1* | 1/2014 | Massaro | B60S 1/528 239/284.2 |
| 2014/0270379 A1* | 9/2014 | Snider | B60R 1/00 382/104 |
| 2015/0375717 A1* | 12/2015 | Kracker | B60S 1/528 134/18 |
| 2018/0354467 A1* | 12/2018 | Glickman | B60S 1/488 |
| 2020/0103522 A1* | 4/2020 | Singh | G01S 13/931 |
| 2020/0290572 A1* | 9/2020 | Rachow | B05B 1/3006 |

FOREIGN PATENT DOCUMENTS

| | | | | |
|---|---|---|---|---|
| FR | 2671529 A1 * | 7/1992 | | B60S 1/528 |
| FR | 2674204 A1 * | 9/1992 | | B05B 15/74 |
| GB | 2267215 A * | 12/1993 | | B60S 1/528 |
| GB | 2272363 A * | 5/1994 | | B60S 1/528 |

OTHER PUBLICATIONS

FR2674204A1, Robert, "Retractable Headlamp Washer With Double Telescopic Piston For A Motor Vehicle", Sep. 25, 1992, French Patent Office (Year: 1992).*

FR2671529A1, Robert, "Retractable Headlamp Washer With Telescopic Piston For Motor Vehicle", Jul. 17, 1992 (Year: 1992).*

* cited by examiner

VEHICLE GRILLE ASSEMBLY

BACKGROUND

Field of the Invention

The present invention generally relates to vehicle grille assembly. More specifically, the present invention relates to vehicle grille assembly having a washer assembly.

Background Information

Vehicles can be equipped with various types of cleaning systems, such as a cleaning system for vehicle headlights and front and rear windshields. Vehicle cleaning systems typically include a reservoir tank that stores cleaning solution and a pump that pumps fluid from the reservoir tank to supply cleaning liquid to various conduits of the vehicle to clean the headlights and/or windshields. Vehicle grilles typically include a grille badge that serves ornamental and identification purposes for the vehicle. Grille badges can also be disposed in front of a vehicle detector (such as radar) to protect the detector while being made to enable signals of the detector to be transmitted therethrough. Vehicles can also include washer assemblies made and configured to clean the grille badge of dirt and debris that may interfere with the performance of the detector.

SUMMARY

In view of the state of the known technology, one aspect of the present disclosure is to provide a vehicle grille assembly comprising a vehicle grille, a grille badge and a washer assembly. The grille has an interior side and an exterior side. The grille badge is supported on a surface of the exterior side of the grille. The washer assembly is disposed adjacent to the grille badge and has a nozzle being configured to move between a stowed position and an operating position. The nozzle is stowed on the interior side of the vehicle grille in the stowed position. The nozzle is on the exterior side of the vehicle grille in the operating position to dispense cleaning fluid toward the grille badge.

In view of the state of the known technology, another aspect of the present disclosure is to provide a vehicle cleaning system comprising a washer assembly and a reservoir tank. The washer assembly is supported to a vehicle grille and disposed adjacent to a vehicle grille badge of the vehicle grille. The washer assembly has a nozzle being configured to move between a stowed position and an operating position. The nozzle is stowed on the interior side of the vehicle grille in the stowed position. The nozzle is on the exterior side of the vehicle grille in the operating position to dispense cleaning fluid toward the grille badge. The reservoir tank is configured to store cleaning solution, the nozzle being in fluid communication the reservoir tank.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
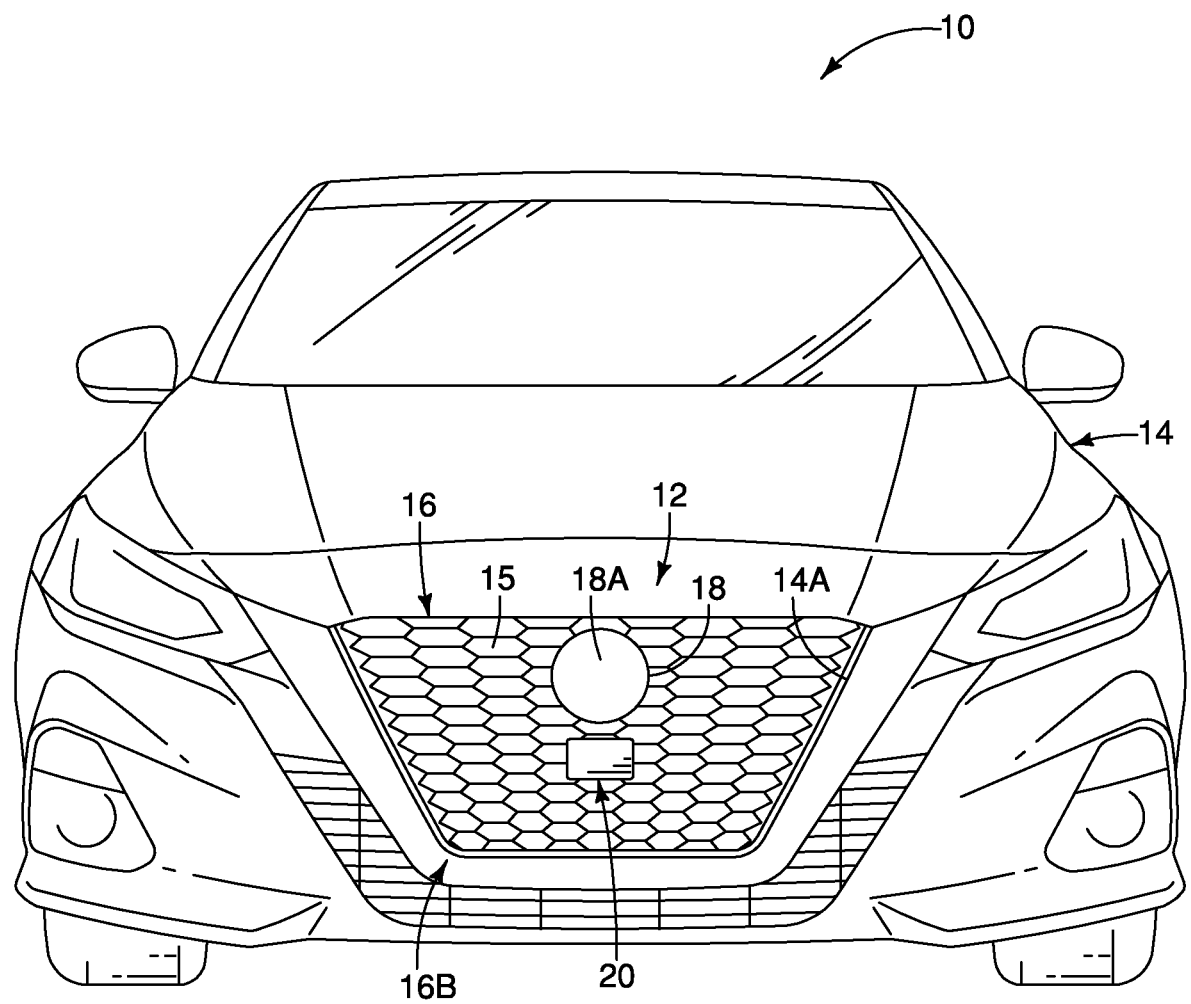
FIG. 1 is a front plan view of a vehicle equipped with a vehicle grille assembly in accordance with the illustrated embodiment.
Figure 7:
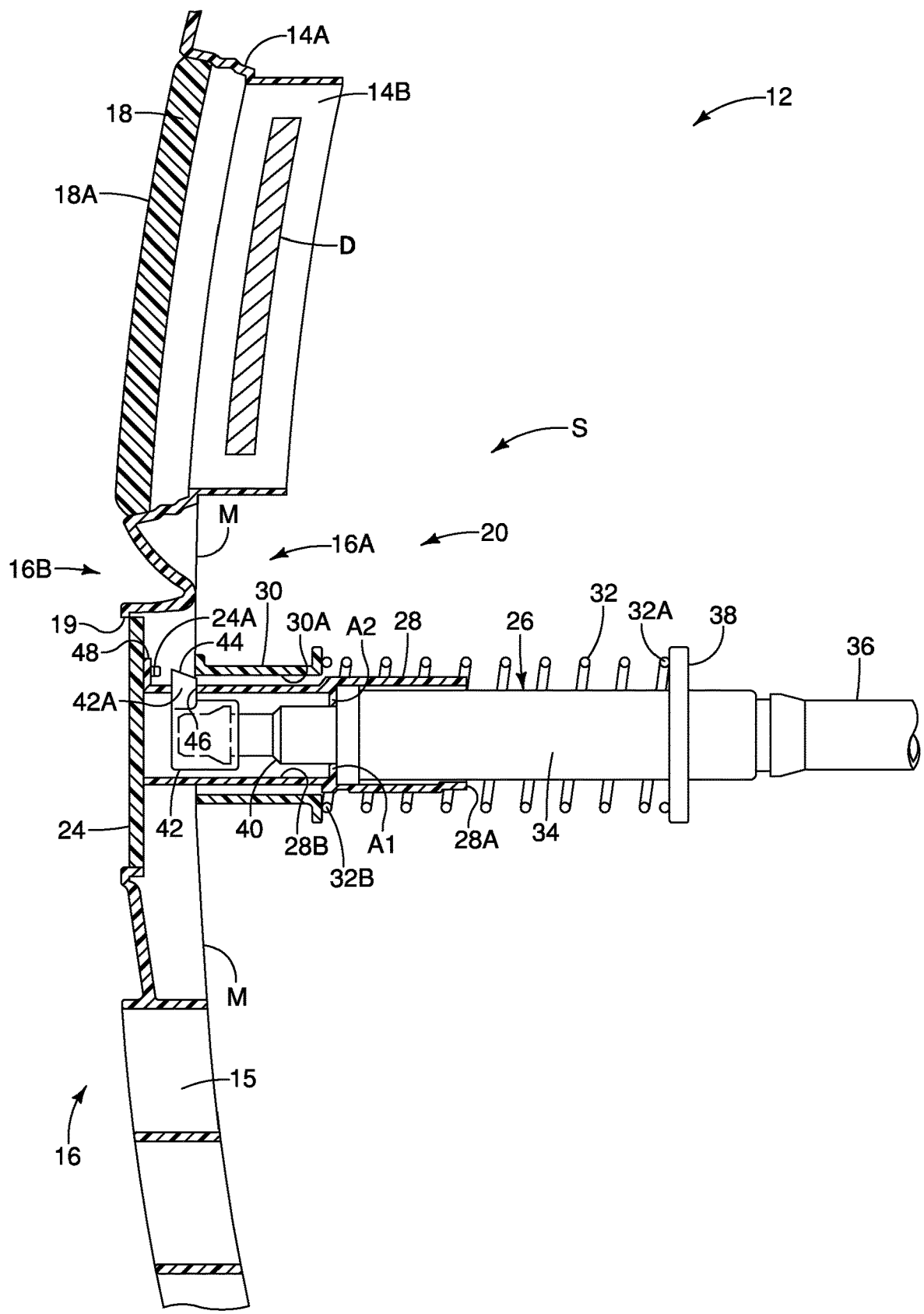
FIG. 7 is a side cross-sectional view of the vehicle grille assembly with the washer assembly in the stowed position.
Figure 8:
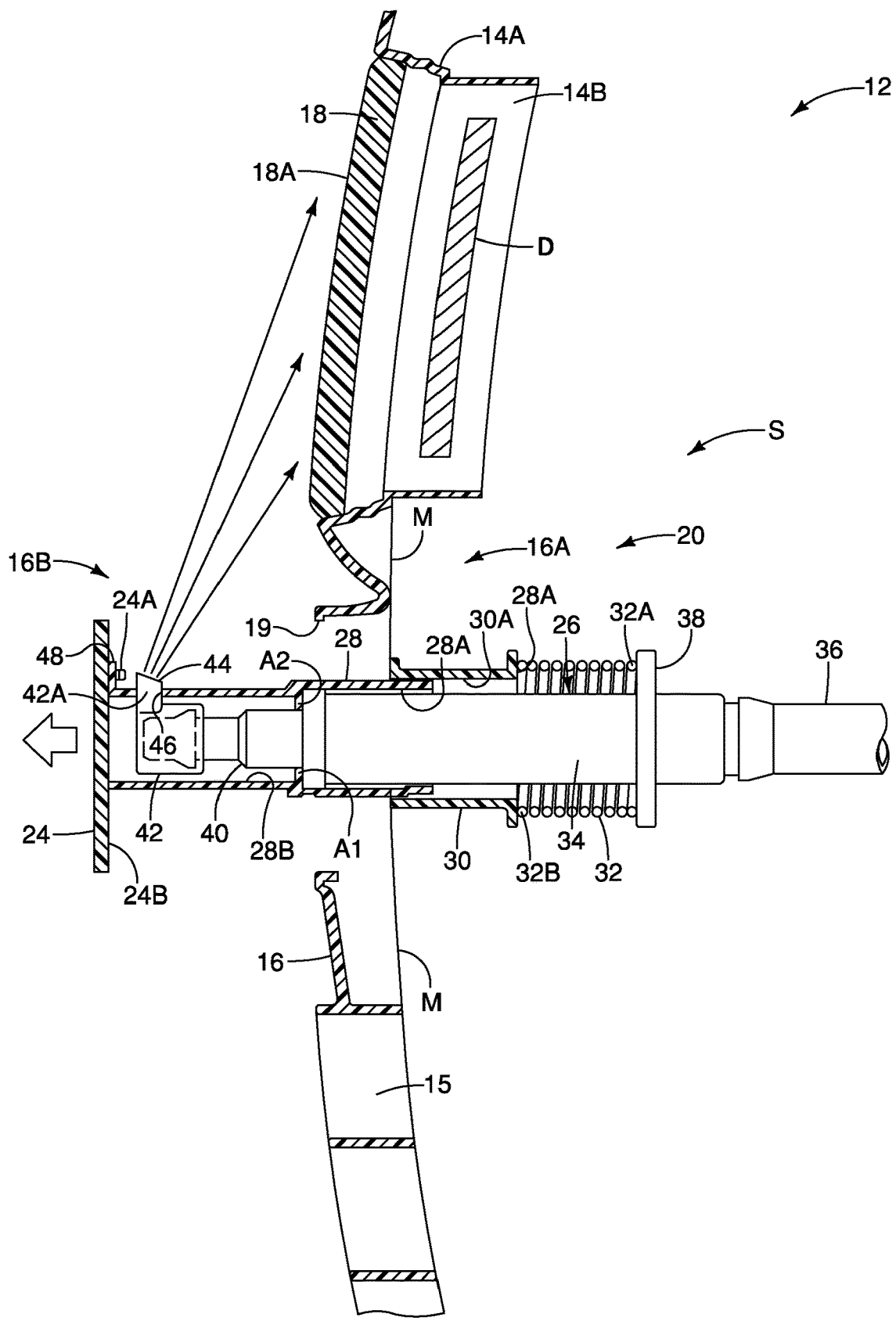
FIG. 8 is a side cross-sectional view of the vehicle grille assembly with the washer assembly in the deployed position.

Referring now to FIG. 1, a vehicle 10 having a vehicle grille assembly 12 is shown in accordance with an illustrated embodiment. The vehicle 10 includes a vehicle body 14 that supports the grille assembly 12. The grille assembly 12 includes a vehicle grille 16 that is a front grille covering an opening 14A of the vehicle body 14 a location underneath a vehicle hood. The vehicle grille 16 is made and positioned to protect the vehicle's 10 radiator (not shown) and engine (not shown). As shown, the grille 16 includes a plurality of openings 15 to allow airflow under the hood in order to cool the engine and radiator. The vehicle 10 further comprises a detector D disposed in an interior compartment 14B of the vehicle 10 that is behind the grille 16. As best seen in FIGS. 7 and 8, the vehicle grille 16 has an interior side 16A and an exterior side 16B. In the illustrated embodiment, the interior side 16A of the vehicle grille 16 refers to the area adjacent to the vehicle grille 16 in the vehicle rearward direction, and the exterior side 16B of the vehicle grille 16 refers to the area adjacent to the vehicle grille 16 in the vehicle forward direction. The detector D is disposed on the interior side 16A of the grille 16.

The grille assembly 12 includes a grille badge 18 disposed forward of the detector D to protect the detector D. That is, the detector D is disposed in the vicinity of the grille badge 18. As shown, the grille badge 18 is supported on the exterior side 16B of the grille 16. The grille 16 further has a cavity 19 disposed below the grille badge 18 that leads to an interior space S on the interior side 16A of the grille 16. The vehicle grille assembly 12 comprises a washer assembly 20 disposed in the interior space S and adjacent to the grille badge 18. Thus, the washer assembly 20 is disposed substantially on the interior side 16A of the grille 16. The washer assembly 20 is configured and arranged to clean the grille badge 18 of debris that could interfere with the operation of the detector D, as will be further described below. The washer assembly 20 is preferably part of a vehicle cleaning system 22, illustrated in FIG. 9. Thus, the vehicle 10 also includes the vehicle cleaning system 22.

Referring to FIGS. 7 and 8, the detector D is preferably disposed on the interior side 16A of the grille 16 at a location behind and in the vicinity of the grille badge 18. The detector D of the illustrated embodiment is made and configured for use in one or more vehicle control systems. In particular, the detector D is preferably configured to emit and transmit electromagnetic radio waves, which have low penetration capabilities with respect to metallic, chrome, and/or polymeric materials that typically are used to make the grille badge 18. For example, the detector D can be a transmit radar sensor configured to emit an electromagnetic radio wave or signal (e.g., with frequencies from about 300 GHz to as low as about 3 kHz) from an antenna (or "transmitter" not shown) of the detector D. Another receiving radar sensor (or "receiver" not shown) is adapted to receive and process the transmitted signals after being reflected from a forward detected external object, such as another vehicle or obstacle located ahead of the vehicle 10. In this way, the detector D can transmit signals that will be used for determining a distance, an angle and/or a velocity of an external object.

The detector D is preferably a radar sensor that is part of a sensor system for use in automated vehicle control of the vehicle 10. The detector D can be one or more of an on-board laser, infrared or video sensor(s). That is, the detector D can be part of a single on-board sensor or part of a multi-sensor radar array that operates in conjunction with a computer-automated vehicle control system. For example, the detector D can detect electromagnetic radio waves for use in automotive vehicle control systems such as Adaptive Cruise Control (ACC alternatively known as Autonomous Cruise Control), Collision Avoidance Systems (CAS), Intelligent Parking Assist Systems (IPAS), lane monitoring systems, and other autonomous vehicle-maneuvering features. In particular, ACC and CAS typically utilize front-mounted radar sensors for determining a distance forward of the vehicle, as well as its relative speed, and/or a directional angle of the vehicle 10.

The grille badge 18 is supported on the exterior side 16B of the grille 16. In the illustrated embodiment, the grille badge 18 is considered a vehicle component that functions in cooperation with the detector D. The grille badge 18 is preferably formed as a radar-transparent jewel-like badge having a multi-dimensional A-surface through which the emitted and/or received radar signals are readily transmitted without significant attenuation. The grille badge 18 has an exterior surface 18A that may gather dirt and other debris during vehicle use that can interfere with the transmissions of the detector D. The washer assembly 20 is configured to clean the exterior surface 18A of the grille badge 18.

Figure 2:
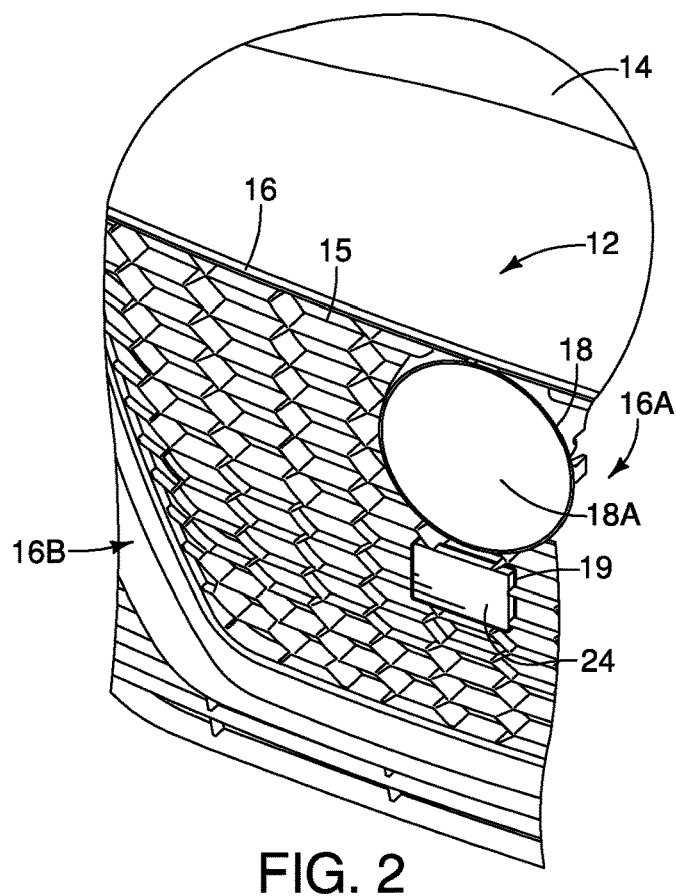
FIG. 2 is an enlarged side perspective view of the vehicle grille assembly showing a washer assembly disposed adjacent to a grille badge.
Figure 3:
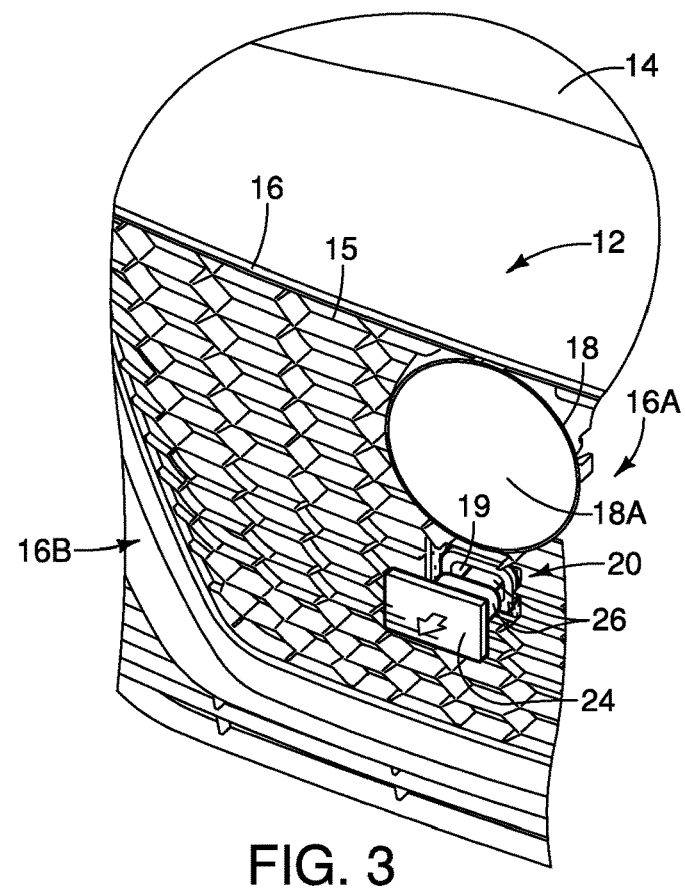
FIG. 3 is an enlarged side perspective view similar to FIG. 2 with the washer assembly moving toward an operating position.
Figure 4:
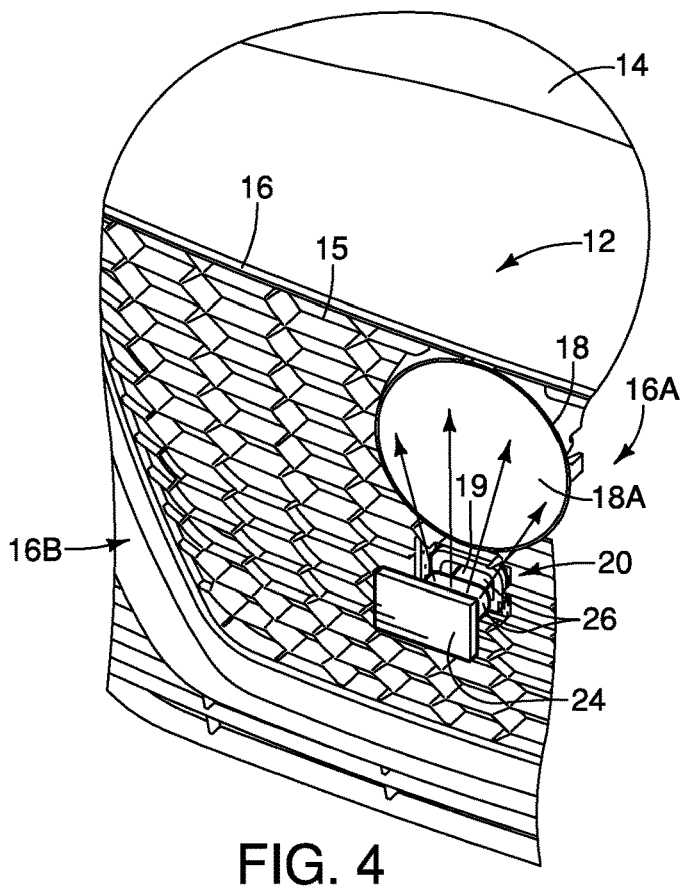
FIG. 4 is an enlarged side perspective view similar to FIGS. 2 and 3 with the washer assembly moving in the operating position.
Figure 5:
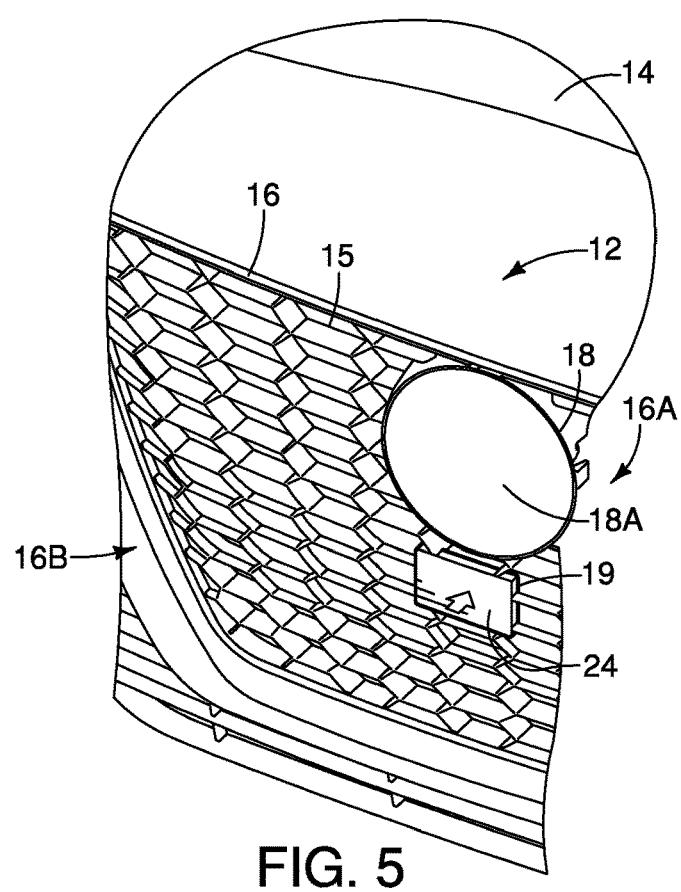
FIG. 5 is an enlarged side perspective view similar to FIGS. 2 to 4 with the washer assembly returning to a stowed position.
Figure 6:
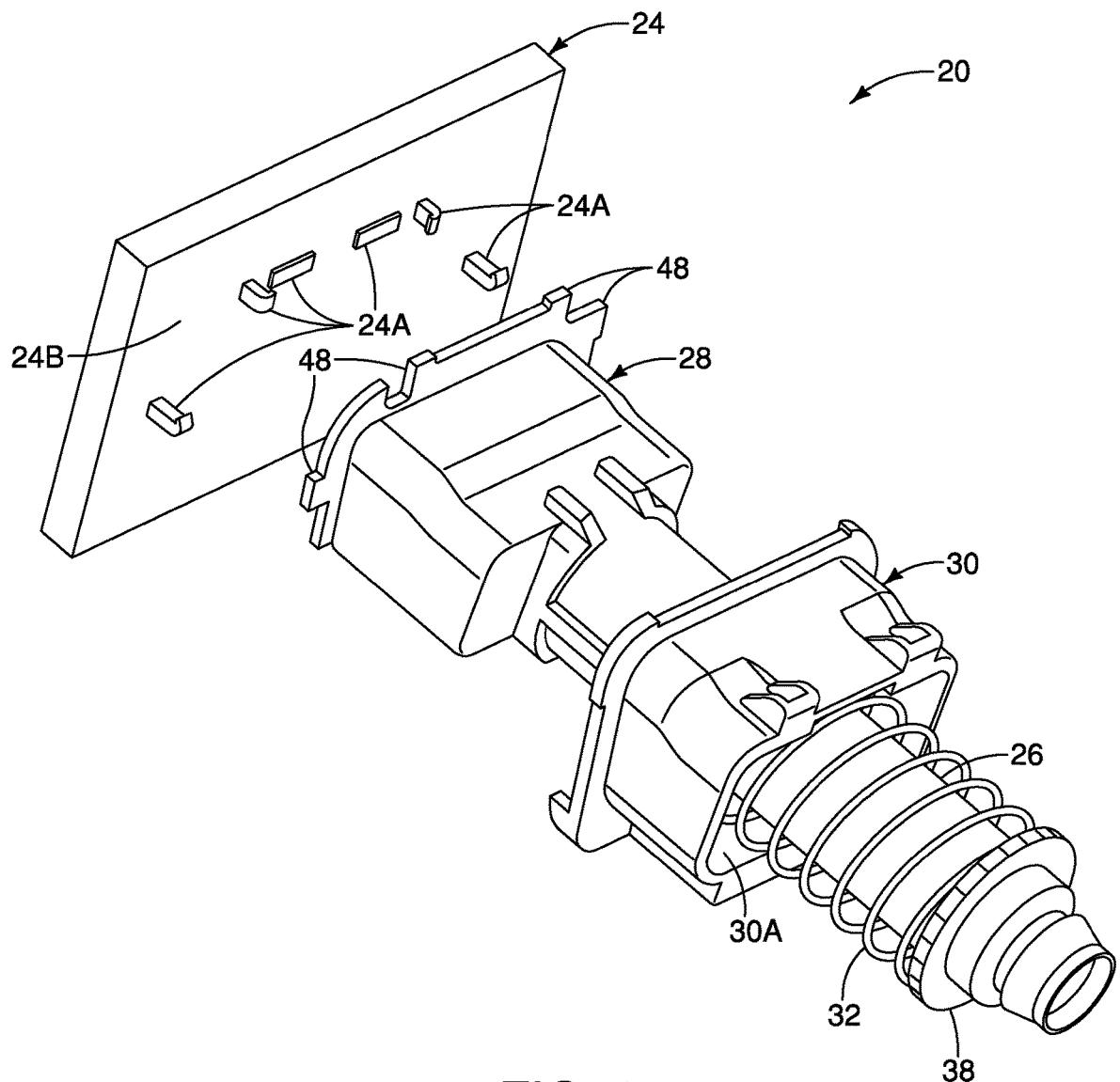
FIG. 6 is a rear exploded view of the washer assembly of FIGS. 2 to 5.

As shown in FIGS. 1 to 3, the washer assembly 20 is disposed adjacent to the grille badge 18. As stated, the washer assembly 20 is disposed in the cavity 19 of the grille 16 that is defined by the interior space S. The washer assembly 20 includes a cover 24 that is disposed over the cavity 19 to enclose the other components of the washer assembly 20 within the interior space S. The washer assembly 20 further includes a nozzle 26 that is configured to spray cleaning fluid toward the exterior surface 18A of the grille badge 18 to clean the grille badge 18 of debris, as shown in FIG. 4. The nozzle 26 is configured to move between a stowed position and an operating position to clean the grille badge 18, as will be described below. The washer assembly 20 further includes a first supporting structure 28 and a second supporting structure 30 that together support the nozzle 26 within the interior space S, as will be further described below. Preferably, the cover 24, the nozzle 26 and the first and second supporting structures 28 and 30 are formed of a rigid, lightweight material such as plastic. The washer assembly 20 further comprises a biasing member 32 that biases the nozzle 26 into the stowed position, as will be further described below.

The cover 24 is sized and dimensioned to correspond to the size and dimensions of the cavity 19. The cover 24 is fixed to the first supporting structure 28. In particular, the cover 24 includes one or more connectors 24A disposed on an interior surface 24B of the cover 24. The connectors 24A are configured to be connected to the first supporting structure 28 to assemble the first supporting structure 28 to the cover 24. The connectors 24A are preferably flexible snap fasteners that receive corresponding protrusion 42As of the first supporting structure 28 in snap-fit connection. In the illustrated embodiment, the first supporting structure 28 moves with the nozzle 26 between the stowed and operating positions. Therefore, the cover 24 movably is supported with respect to the grille 16 via the first supporting structure 28. That is, the cover 24 opens the opening to expose the nozzle 26 when the nozzle 26 and the first supporting structure 28 move to the operating position from the stowed position. The components of the washer assembly 20, aside from the cover 24, are disposed on the interior side 16A of the grille 16, as best seen in FIGS. 7 and 8.

In the illustrated embodiment, the nozzle 26 includes an elongated tube 34 that is connected to a delivery conduit 36 of the vehicle cleaning system 22 to fluidly receive cleaning liquid of the vehicle cleaning system 22, as will be described below. As shown, the nozzle 26 includes an annular flange 38 disposed at the elongated tube 34. The annular flange 38 forms a stopper for the nozzle 26 during operation between the stowed and operating positions. The nozzle 26 further includes a head portion 40 that can be detachably connected or integrally connected to the elongated tube 34. Preferably, the head portion 40 has an outer diameter that is smaller than an outer diameter of the elongated tube 34 such that the nozzle 26 includes an abutment A1 disposed on the elongated tube 34 that abuts the first supporting structure 28 from the vehicle rearward direction. The nozzle 26 preferably further includes an end piece 42 detachably or integrally connected to the head portion 40.

In the illustrated embodiment, the end piece 42 is illustrated has a plurality of outlets 44 for spraying the cleaning liquid. As best seen in FIG. 8, the end piece 42 has a protrusion 42A that includes the outlets 44. The protrusion 42A extends through an aperture 46 of the first supporting structure 28 in a direction toward the grille badge 18. The nozzle 26 can include other types of end pieces of different configurations to spray the cleaning liquid as needed and/or desired. For example, the end piece 42 can be adjustable to give a spray at any desired angle onto the lens. Additionally, the end piece 42 can be configured to emit different type(s) of spray, such as a needle spray for fine sharp impact, or a soft spray for rinsing thereafter to flush off the dirt loosened by the sharp spray. Further, the end piece 42 is illustrated as having the outlets 44, it will be apparent to those skilled in the vehicle field from this disclosure that the outlets 44 can alternatively be disposed on the head portion 40 to spray cleaning liquid as needed and/or desired.

As shown in FIG. 7, the nozzle 26 is stowed on the interior side 16A of the vehicle grille 16 in the stowed position. As shown in FIG. 8, the nozzle 26 protrudes from the cavity 19 and is on the exterior side 16B of the vehicle grille 16 in the operating position to dispense cleaning fluid toward the grille badge 18. Therefore, the nozzle 26 moves through the cavity 19 of the grille 16 when moving between the stowed and the operating positions. As stated, the cover 24 is movable to expose the nozzle 26 when the nozzle 26 moves into the operating position.

The first supporting structure 28 is disposed in the interior space S defined by the cavity 19 of the grille 16. The first supporting structure 28 is operatively connected to the nozzle 26 to form a recessed mounting surface for the nozzle 26 on the interior side 16A of the grille 16. The first supporting structure 28 includes a receiving opening 28A for receiving the nozzle 26 into an interior 28B of the first supporting structure 28. An end of the elongated tube 34 forms the abutment A1 that abuts another abutment A2 formed from the interior 28B of the first supporting structure 28. Thus, the nozzle 26 pushes against the first supporting structure 28 at the abutments A1 and A2 so that the first supporting structure 28 moves with the nozzle 26 during operation. In particular, the nozzle 26 pushes the first supporting structure 28 from the vehicle rearward direction towards the vehicle forward direction so that the nozzle 26 and the first supporting structure 28 move from the interior side 16A to the exterior side 16B of the grille 16. The first supporting structure 28 includes a plurality of protrusion 48 that are attached to the connectors 24A of the cover 24. Therefore, the cover 24 is fixed to the first supporting structure 28 such that the cover 24 moves with the first supporting structure 28 and opens the opening when the nozzle 26 moves from the stowed position to the operating position. In the illustrated embodiment, the first supporting structure 28 can be considered a shield bracket of the washer assembly 20.

The second supporting structure 30 telescopically receives the first supporting structure 28 so that the first supporting structure 28 moves with respect to the second supporting structure 30 to move the nozzle 26 between the stowed and operating positions. That is, the second supporting structure 30 includes an interior 30A that is sized and dimensioned to receive the first supporting structure 28 for a snug fit. In the illustrated embodiment, as best seen in FIGS. 7 and 8, the second supporting structure 30 is fixedly mounted to the interior side 16A of the grille 16 in a conventional manner. In particular, the second supporting structure 30 is fixedly mounted to a mounting surface M on the interior side 16A of the grille 16. In this way, the second supporting structure 30 supports the first supporting structure 28 and the nozzle 26 to the grille 16. During operation of the nozzle 26, the first supporting structure 28 and the nozzle 26 move telescopically with respect to the second supporting structure 30 which remains stationary. When the nozzle 26 is in the stowed position, the first supporting structure 28 and the nozzle 26 are retained in the second supporting structure 30. When the nozzle 26 is in the operating position, the nozzle 26 and the first supporting structure 28 move telescopically with respect to the second supporting structure 30 to extend from the interior space S. The second supporting structure 30 can be considered a retention bracket of the washer assembly 20.

The washer assembly 20 further comprises the biasing member 32 operatively connected to the nozzle 26 and one of the first and second supporting structures 28 and 30 to bias the nozzle 26 into the stowed position. In particular, the biasing member 32 is operatively connected to the nozzle 26 and the second supporting structure 30. However, it will be apparent to those skilled in the vehicle field from this disclosure that the biasing member 32 can operatively connect the nozzle 26 to another stationary structure of the grille assembly 20 such as the vehicle grille 16 to bias the nozzle 26 into the stowed position.

As shown, the biasing member 32 is a coiled tension spring wrapped around the nozzle 26 and the first supporting structure 28. The biasing member 32 has a first end 32A fixedly attached to the annular flange 38 of the nozzle 26 and a second end 32B fixedly attached to the second supporting structure 30 in a conventional manner. The biasing member 32 has an outer diameter that is larger than an outer diameter of the first supporting structure 28. The elongated tube 34 of the nozzle 26 is connected to the delivery conduit 36 to receive hydraulic pressure from a reservoir tank 50 of the cleaning system 22, which pushes the nozzle 26 into the operating position and depresses the biasing member 32. While the biasing member 32 is illustrated as being a coiled spring, it will be apparent to those skilled in the vehicle field from this disclosure that the biasing member 32 can be alternative types of biasing members, as needed and/or desired. For example, the biasing member 32 can alternatively be a retention clip that is clipped to the first supporting structure 28 at a retention area of the first supporting structure 28, and also clipped at another end to the nozzle 26 to retain the nozzle 26 with respect to the first supporting structure 28.

Figure 9:
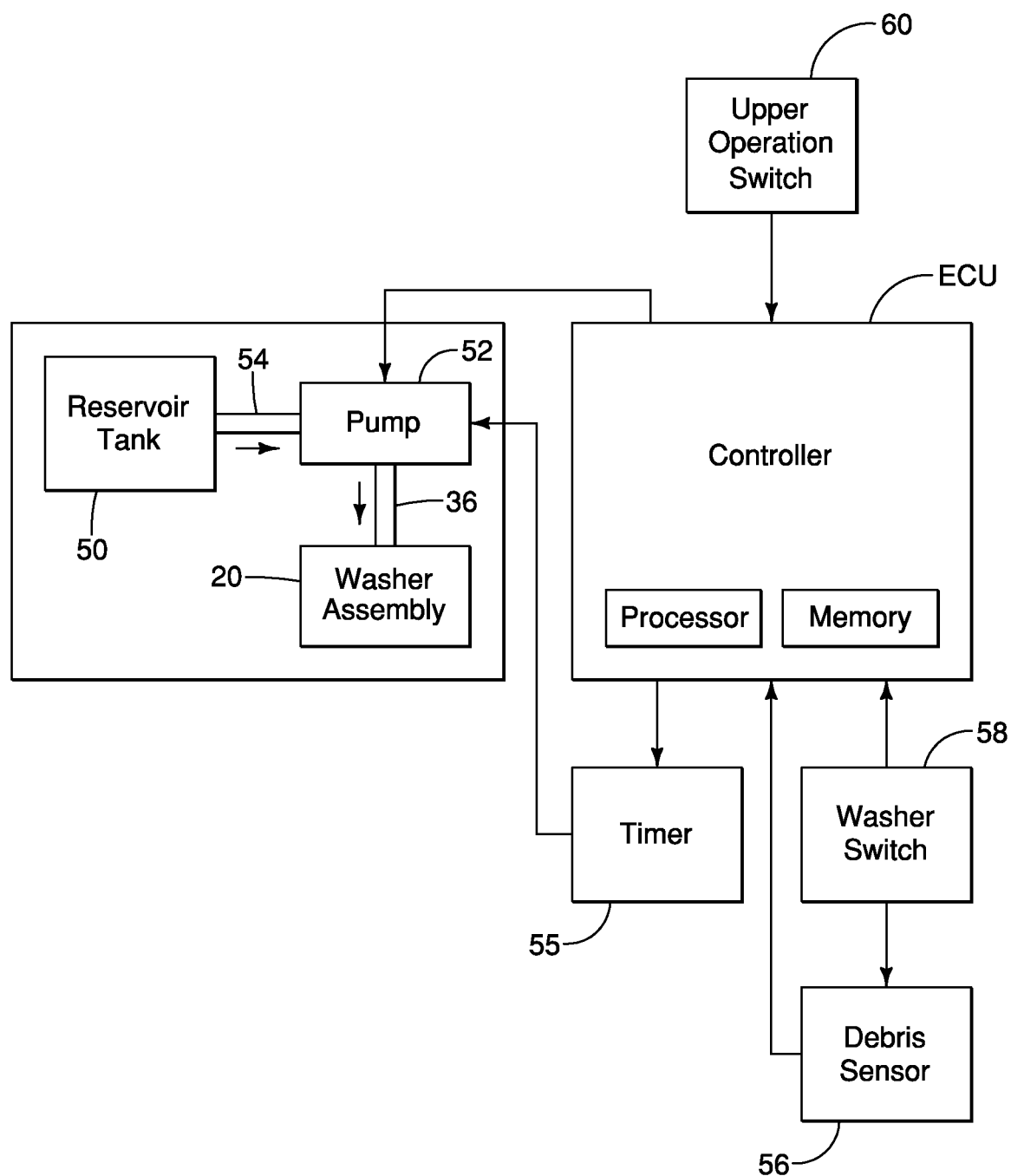
FIG. 9 is diagrammatic view of a vehicle cleaning system having the washer assembly.

As shown in FIG. 9, the vehicle cleaning system 22 comprises the reservoir tank 50 that stores cleaning solution, such as windshield washer fluid. The vehicle cleaning system 22 further comprises a pump 52 that is in fluid communication with the reservoir tank 50. The cleaning system 22 further includes an intake conduit 54 that fluidly connects the pump 52 to the reservoir tank 50. The cleaning system 22 further includes the delivery conduit 36 that is fluidly connected to the nozzle 26 of the washer assembly 20 and the pump 52. The delivery conduit 36 delivers pressurized cleaning solution from the pump 52 to the nozzle 26. Therefore, the nozzle 26 is in fluid communication the reservoir tank 50 via the delivery conduit 36 and the intake conduit 54.

The vehicle cleaning system 22 further comprises an electronic controller ECU that controls the vehicle cleaning system 22 to move the nozzle 26 between the stowed and operating positions. The electronic controller ECU is preferably a microcomputer that includes one or more processor and one or more storage device (i.e., a computer memory device). The memory is any computer storage device or any computer readable medium with the sole exception of a transitory, propagating signal. For example, the memory can be nonvolatile memory and volatile memory, and can includes a ROM (Read Only Memory) device, a RAM (Random Access Memory) device, a hard disk, a flash drive, etc. The storage device is configured to store settings, programs, data, calculations and/or results of the processor(s).

In particular, the controller ECU activates the pump 52 to supply water to the nozzle 26. That is, when the pump 52 is activated by the controller ECU, cleaning liquid is delivered under pressure through the delivery conduit 36 to the nozzle 26. The pump 52 is preferably an electrically driven rotary pump 52 that can include an electric motor (not shown) that is activated by the controller ECU to activate the pump 52. Preferably, the vehicle cleaning system 22 further comprises a timer 55 electrically connected to the controller ECU to control a period of operation of the washer assembly 20. For example, the timer 55 is configured to automatically arrest operation the nozzle 26. Preferably, the timer 55 is arranged to control operation of the pump 52 to stop the supply of pressurized fluid to the nozzle 26 after a prescribed period.

As shown in FIG. 9, the cleaning system 22 preferably includes a debris sensor 56 to detect a prescribed amount of debris on the grille badge 18. The debris sensor 56 can be an electric eye, photodetector or photocell that can detect the diminution of light through the grille badge 18 due to a buildup of dirt or debris. The debris sensor 56 can transmit a signal to the controller ECU which activates the pump 52. Alternatively, the debris sensor 56 can be connected to a washer switch 58 that is connected in an operation circuit of another vehicle washing system, such as a headlight washing system of the vehicle 10 or a windshield washing system of the vehicle 10. In this way, the debris sensor 56 can automatically transmit its signal to other washing systems of the vehicle 10 to initiate operation cycles of other washing systems. Additionally, the controller ECU can be preprogrammed to activate the pump 52 at predetermined periods, such as each time the vehicle 10 is turned ON. The vehicle cleaning system 22 preferably also includes a user operation switch 60 disposed on a vehicle dashboard for manual operation of the washer assembly 20 to enable washing of the grille badge 18 at user convenience.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle grille assembly. Accordingly, these terms, as utilized to describe the present invention should be interpreted relative to a vehicle equipped with the vehicle grille assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle grille assembly comprising:
   a vehicle grille having an interior side and an exterior side;
   a grille badge supported on a surface of the exterior side of the grille; and
   a washer assembly disposed adjacent to the grille badge, the washer assembly having a nozzle being configured to move between a stowed position and an operating position, the nozzle having an elongated tube and an aperture fluidly connected to the elongated tube to spray fluid when the nozzle is in the operating position, the nozzle being stowed on the interior side of the vehicle grille in the stowed position, the nozzle being on the exterior side of the vehicle grille in the operating position to dispense cleaning fluid toward the grille badge, the washer assembly further comprises a cover movably attached to the grille to expose the nozzle when the nozzle moves into the operating position, the cover being aligned with the grille when the nozzle is in the stowed position, the cover being spaced with respect to the grille when the nozzle is in the operating position,
   a first supporting structure having an interior space that receives the nozzle, the first supporting structure being fixed to the nozzle to move with the nozzle as the nozzle moves between the stowed position and the operating position so that the nozzle is not movable relative to the first supporting structure, and
   a second supporting structure having an interior space that telescopically receives the first supporting structure, the nozzle and the first supporting structure together being movable relative to the second supporting structure, wherein, the nozzle extends interiorly beyond the first supporting structure and the second supporting structure.

2. The vehicle grille assembly according to claim 1, wherein
   the grille has a cavity disposed below the grille badge, the nozzle extending from the cavity when moving from the stowed position to the operating position.

3. The vehicle grille assembly according to claim 2, wherein
   the first supporting structure is operatively connected to the nozzle to form a recessed mounting surface for the nozzle on the interior side of the grille.

4. The vehicle grille assembly according to claim 3, wherein
   the second supporting structure is fixedly mounted to the interior side of the grille.

5. The vehicle grille assembly according to claim 4, wherein
   the washer assembly further comprises a biasing member operatively connected to the nozzle and the second supporting structure to bias the nozzle into the stowed position.

6. A vehicle cleaning system comprising:
a washer assembly supported to a vehicle grille and being disposed adjacent to a vehicle grille badge of the vehicle grille, the washer assembly having
  a nozzle being configured to move between a stowed position and an operating position, the nozzle being stowed on an interior side of the vehicle grille in the stowed position, the nozzle being on an exterior side of the vehicle grille in the operating position to dispense cleaning fluid toward the grille badge, the nozzle having an elongated tube and an aperture fluidly connected to the elongated tube to spray fluid when the nozzle is in the operating position,
  a cover configured to be movably supported with respect to the vehicle grille, the cover being openable to expose the nozzle when the nozzle moves into the operating position, the cover being aligned with the grille when the nozzle is in the stowed position, the cover being spaced with respect to the grille when the nozzle is in the operating position;
  a first supporting structure having an interior space that receives the nozzle, the first supporting structure being fixed to the nozzle to move with the nozzle as the nozzle moves between the stowed position and the operating position so that the nozzle is not movable relative to the first supporting structure, and
  a second supporting structure having an interior space that telescopically receives the first supporting structure, the nozzle and the first supporting structure together being movable relative to the second supporting structure, wherein, the nozzle extends interiorly beyond the first supporting structure and the second supporting structure, and
a reservoir tank configured to store cleaning solution, the nozzle being in fluid communication with the reservoir tank.

7. The vehicle cleaning system according to claim 6, further comprising
  a controller that controls the vehicle cleaning system to move the nozzle between the stowed and operating positions.

8. The vehicle cleaning system according to claim 7, further comprising
  a pump in fluid communication with the reservoir tank, the controller activating the pump to supply water to the nozzle.

9. The vehicle cleaning system according to claim 8, further comprising
  a timer electrically connected to the controller to control a period of operation of the washer assembly.

10. The vehicle cleaning system according to claim 6, wherein
  the first supporting structure is operatively connected to the nozzle to form a recessed mounting surface for the nozzle on the interior side of the grille.

11. The vehicle cleaning system according to claim 10, wherein
  the second supporting structure is fixedly mounted to a surface of the interior side of the grille.

12. The vehicle cleaning system according to claim 11, wherein
  the washer assembly further comprises a biasing member operatively connected to the nozzle and the second supporting structure to bias the nozzle into the stowed position.

13. A vehicle having the vehicle grille assembly according to claim 1, further comprising
  a detector disposed on the interior side of the grille and behind the grille badge.

14. The vehicle according to claim 13, further comprising
  a reservoir tank configured to store cleaning solution, the nozzle being in fluid communication with the reservoir tank.

15. The vehicle according to claim 14, further comprising
  a controller that controls the vehicle cleaning system to move the nozzle between the stowed and operating positions.

16. The vehicle grille assembly according to claim 1, wherein
  the aperture sprays fluid upward away from the nozzle toward the grille badge when the nozzle is in the operating position.

17. The vehicle grille assembly according to claim 5, wherein
  a first end of the biasing member is operatively fixed to the nozzle and a second end of the biasing member is fixed to the grille to bias the nozzle into the stowed position.

* * * * *